United States Patent [19]

Harper et al.

[11] Patent Number: 4,907,232
[45] Date of Patent: Mar. 6, 1990

[54] FAULT-TOLERANT PARALLEL PROCESSING SYSTEM

[75] Inventors: Richard E. Harper, Needham; Jaynarayan H. Lala, Wellesley, both of Mass.

[73] Assignee: The Charles Stark Draper Laboratory, Inc., Cambridge, Mass.

[21] Appl. No.: 187,474

[22] Filed: Apr. 28, 1988

[51] Int. Cl.[4] .............................................. G06F 11/00
[52] U.S. Cl. ...................................... 371/36; 371/11.3
[58] Field of Search ...................... 371/11, 67, 36, 10, 371/15, 16, 11.1, 11.3, 67.1, 68.3, 36, 9.1, 10.1, 15.1, 16.1; 364/200 MS File, 900 MS File

[56] References Cited

U.S. PATENT DOCUMENTS

| | | | |
|---|---|---|---|
| 4,356,546 | 10/1982 | Whiteside | 371/36 |
| 4,375,683 | 3/1983 | Wensley | 371/36 |
| 4,562,575 | 12/1985 | Townsend | 371/36 |
| 4,583,224 | 4/1986 | Ishii | 371/36 |

OTHER PUBLICATIONS

Roger M. Kieckhafer et al., "The MAFT Architecture for distributed Fault Tolerance," *IEEE Transactions on Computers*, vol. 37, No. 4, Apr. 1988, pp. 398–405.
Albert L. Hopkins, Jr. et al., "FTMP-A Highly Reliable Fault-Tolerant Multiprocessor for Aircraft", *Proceedings of the IEEE*, vol. 66, No. 10, Oct. 1978, pp. 1221–1239.
J. H. Lala et al., "A Fault Tolerant Processor to Meet Rigorous Failure Requirements", The Charles Stark Draper Laboratory, Inc.
Daniel L. Palumbo et al., "A Performance Evaluation of the Software-Implemented Fault-Tolerance Computer", *J. Guidance*, vol. 9, No. 2, Mar.-Apr. 1986, pp. 175–180.

*Primary Examiner*—Michael R. Fleming
*Attorney, Agent, or Firm*—Robert F. O'Connell

[57] ABSTRACT

A fault tolerant processing system which includes a plurality of at least $(3f+1)$ fault containment regions each including a plurality of processors and a network element connected to each of the processors and to the network elements of the other regions. Groups of processors are used to form redundant processing sites, the number of each group being included in a different fault containment region. The operations of the network elements are synchronized and the system can be arranged to re-configure the groups of processors so as to form different pluralities of redundant processing sites.

9 Claims, 4 Drawing Sheets

PHASE 2

PHASE 1

FAULT-TOLERANT PARALLEL PROCESSING SYSTEM

INTRODUCTION

This invention relates generally to data processing systems, and more particularly, to fault-tolerant parallel processing systems using parallel processors for providing relatively high data throughputs as well as high reliability in the face of faults which arise in the system.

BACKGROUND OF THE INVENTION

In many systems which process information, particularly systems used for making critical decisions in real time, it is necessary that such systems have a high degree of reliability, such that the allowable probability of a failure per unit time is extremely low. Such systems, as may be used in aircraft, space vehicles, medical applications, and the like, also demand a substantially high level of processing performance. Such performance includes not only the provision of a high data throughput and large memory capability, but also the ability to satisfy whatever unique requirements are imposed by the real time operational environment. Thus, the processing architecture must be designed to be capable of adapting itself to the varying requirements of the task being performed in real time. Conventional redundant processing systems which can normally be used for many applications often do not have a sufficient degree of reliability to be safely used in highly critical applications, and it is desirable to provide new approaches to the problem of fault tolerance, particularly where more than one fault may have to be tolerated, e.g., in systems where a fault which arises cannot be corrected before another fault arises. While such conditions may be relatively rare, in critical applications the existence of such conditions, if not fully corrected, may give rise to extremely costly and even life-threatening malfunctions of the overall system.

Further, a conservative, but not unrealistic, model of failure behavior is to consider failures which may arise because of arbitrary behavior on the part of one or more failed components. Such failures are often referred to a Byzantine faults or as giving rise to "malicious" errors. Undiagnosed malicious errors or Byzantine failures may occur without detection, and many systems simply are incapable of detecting and correcting for such faults.

It has been determined by those in the art that certain requirements must be met in order to avoid not only normal faults but also such Byzantine or malicious faults. Such requirements can be summarized as the following criteria in which the term "f" represents the number of faults which are to be simultaneously handled:

1. There must be at least $(3f+1)$ redundant processing participants (i.e. processing elements) for the algorithm which is being implemented, each participant residing in a different fault containment region.
2. Each participant must be connected to each other participant through at least $(2f+1)$ disjoint communication paths.
3. There must be a minimum of $(f+1)$ rounds of communication among the participants in the execution of the algorithm.
4. The participants must be appropriately time synchronized in their operations with respect to one another to within a known time skew of each other.
5. In order to mask simultaneous faults by voting of the output of redundant executions in the computation, $(2f+1)$ executions, i.e., $(2f+1)$ processing elements are required to guarantee that a majority of non-faulty executions exist.

A system which satisfies such criteria and is thereby capable of executing the appropriate algorithm is often called a "f-Byzantine resilient" system. Currently available high-throughput systems do not appear to meet all of the above requirements and it is desirable to provide a system which can do so.

One such approach to providing a Byzantine resilient processing system has been described in the article: "Advanced Information Processing System" by J. H. Lala, AIAA/IEEE, 6th Digital Avionics Conference, Baltimore, Md., Dec. 3-6, 1984. In the systems described therein, for example, the theoretical requisite regions of connectivity between them are provided between members of a single redundant processing site composed of at least $(3f+1)$ processing elements. Such minimally-sized processing sites are then connected to each other to form a parellel processing ensemble using inter-group links which do not possess the requisite $(2f+1)$ connectivity. In such a technique, members of different redundant groups cannot be grouped together to form new redundant groups as members of a former group fail. For example, if a processing element in a first redundant processing site and another processing element in a second redundant processing site were to fail, inadequate connectivity exists between the surviving members of both processing sites to permit the formation of another redundant processing site. Thus, the significant potential for attrition resiliency and graceful degradation of performance in the operation of the system cannot be achieved.

Another approach is shown in the article: "SIFT, Design and Analysis of a Fault-Tolerant Computer for Avicraft Control" by J. H. Wensley et al, Proc, of the IEEE, Vol. 66, No. 10, October 1978, in which each processor element of the system is connected to each other processor element of the system in a fully-connected overall network. Any processor element can then be grouped to any other processor element to form a redundant processing site. As long as there are $(3f+1)$ non-faulty processing elements, an f-fault masking redundant processing site may be configured. However, the cost and complexity of providing full interprocessor connectivity increases quadratically with the size of the system, i.e. the number of processing elements in the system, thereby rendering such an approach far too costly in terms of the number of communication links and ports required for a relatively large size system. In addition, the processing elements comprising a redundant processing site are responsible for the fault tolerance specific functions, whose execution consumes a significant portion of the computational throughput, thereby reducing the overall information throughput which is desired.

Accordingly, it is desirable to design a new Byzantine resilient fault-tolerant system which avoids the disadvantages of the above approaches and provides attrition resiliency and graceful performance degradation at a reasonable complexity and cost.

SUMMARY OF THE INVENTION

In accordance with the invention, a fault-tolerant processing system for tolerating f-failures comprises a plurality of fault containment regions, each of the regions including a plurality of processing elements and a network element, which network element is connected to the processing elements and to each of the network elements of the other fault containment regions of the system. Groups of one or more processing elements form a plurality of redundant processing sites, each of the processing elements of a particular group being a part of, or included in, a different fault containment region. In such system, each network element of a fault containment region includes means for transmitting messages to other network elements of other fault containment regions, means responsive to messages from other network elements for providing voted output messages, and means for synchronizing the operations of the network element and the processing elements of a redundant group thereof whose members are contained in different fault containment regions of the system. The use of such network elements in each fault containment region provides a system which can satisfy all of the requisite requirements discussed above and at the same time provide sufficient connectivity and redundancy so as to meet the desired data processing throughput and reliability needs of the overall system in critical applications. Such an approach provides adequate connectivity, but at a reasonable cost, so as to produce the desired operation.

BRIEF DESCRIPTION OF THE DRAWINGS

The invention can be described in more detail with the help of the accompanying drawings.

DESCRIPTION OF THE PREFERRED EMBODIMENT

Figure 1:
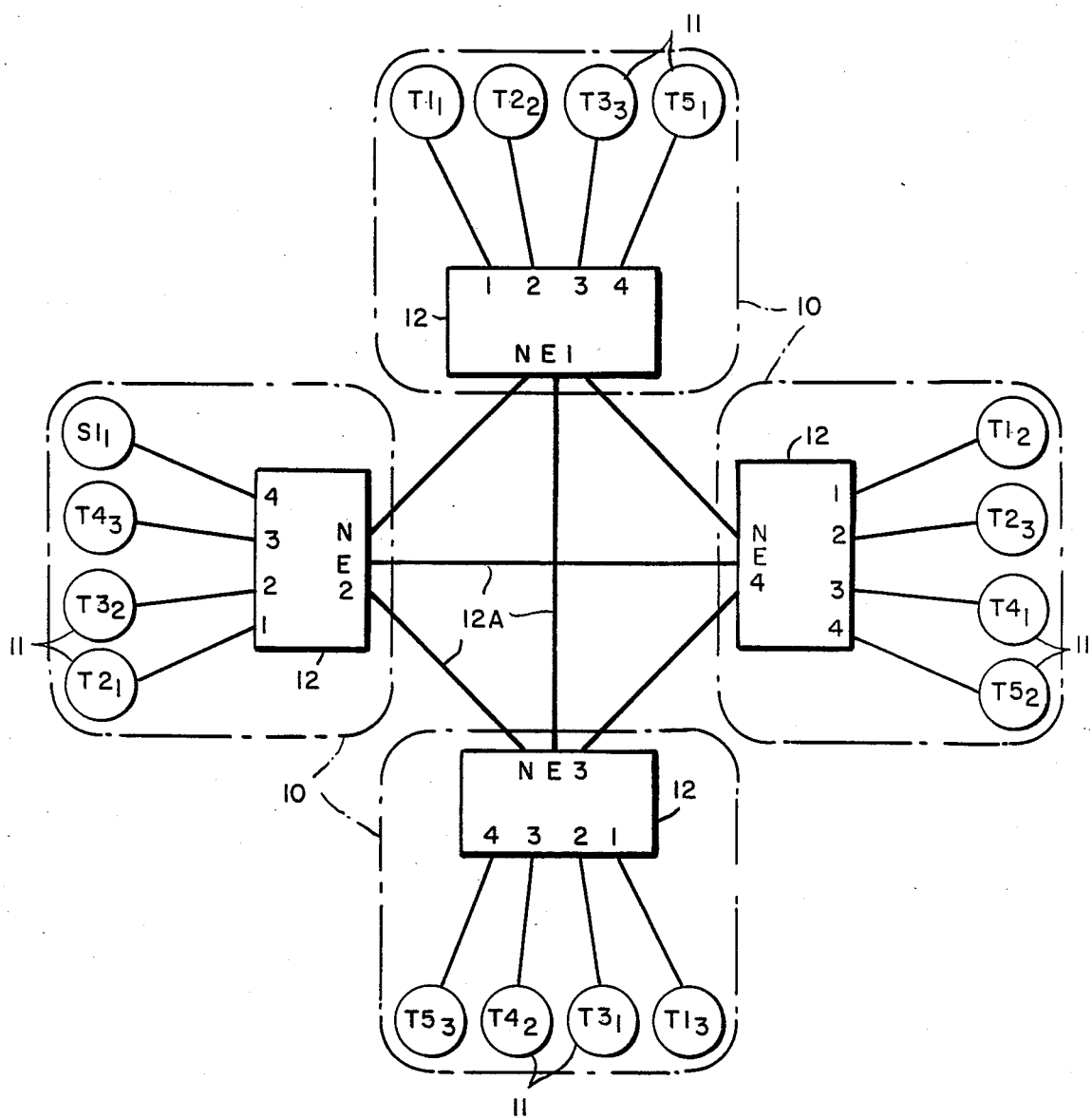
FIG. 1 shows a block diagram of an exemplary fault-tolerant processing system in accordance with the invention.

As can be seen in the exemplary system of FIG. 1, a plurality of fault containment regions 10, shown in the example as four separate regions, each includes a plurality of processing elements 11, there being in this example four processing elements in each region. A network element 12 in each region is connected to each of the processing elements in its associated fault containment region and is, in turn, inter-connected with each of the other network elements of the other fault containment regions, as shown by the inter-connecting lines 12A. The use of such network elements and interconnections provides a fully connected, tightly synchronized overall system. The network elements 12 in effect act as hosts to several subscriber processing elements 11, for which the network element aggregate performs Byzantine resilient synchronization, concensus, voting and consistent ordering functions. In effect, the purpose of the aggregate of network elements, is to "broker" Byzantine resilient consistency for the processing element subscribers, so as to permit each of the processing elements to carry on with its own proper task in the overall computation. The system shown in FIG. 1 can be thought of as a 16-processor element, 4-network element cluster, each of the network element of the cluster being fully connected to each other network element via point-to-point communication links, which also serve as physical fault isolation barriers. Each network element possesses a port to each subscriber processor element of its fault containment region, and, given at least $(3f+1)$ non-faulty network elements and $(2f+1)$ non-faulty processor elements in the cluster, the cluster can tolerate any combination of f network element and processing element Byzantine failures.

In the fault-tolerant cluster of FIG. 1, the system can be initially configured into a plurality of virtual processing groups or processing sites. A virtual processing group is a potential redundant processing site which is fault-masking if it possesses $(2f+1)$ members, is fault-detecting if it has $(f+1)$ members, and is a simplex, or non-redundant, processing site, otherwise. In the particular example shown, there are five triad processing sites and one simplex processing site. The five triad sites are denoted as T1 through T5, each being a triply redundant, fault-masking virtual group. Thus, a virtual group possesses n members, where n is the level of processor redundancy of the virtual group, in this case n being 3. Each virtual group or processing site is denoted in FIG. 1 by a subscript. Thus, processing site 1 comprises triad members $T1_1$, $T1_2$ and $T1_3$, and so forth. The single simplex group in the example shown is denoted by $S1_1$. By convention, the member number of the sole member in the simplex group is 1. Thus, it can also be seen that each member 11 of a redundant processing group is taken from a different fault containment region 10.

Figure 2:
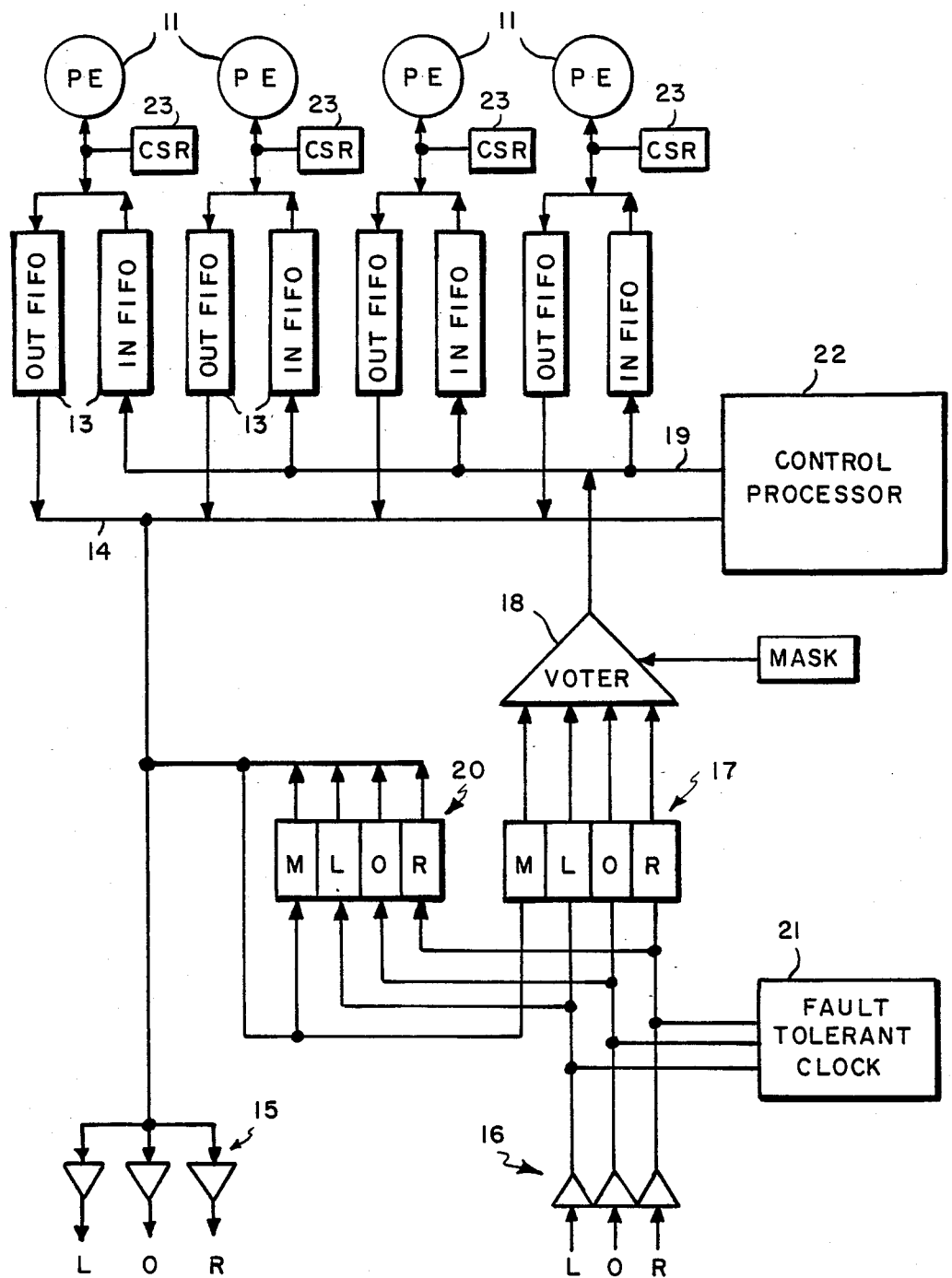
FIG. 2 shows a block diagram of an exemplary network element shown in FIG. 1.

Each of the network elements of a fault containment region has a configuration as shown in FIG. 2. Processor elements 11 interface to the network element 12 via buffer elements 13, which are in the nature of first in, first out (FIFO) buffers. One of the buffer elements 13 is an input FIFO buffer while the other is an output FIFO buffer, with respect to a particular processor element. A FIFO buffer can be appropriately identified to be an ordered pair (i, j), where the first number of the pair, i, is the number of the network element to which the processing element subscribes and the second number of the pair, j, is the number of the network element port upon which the processor element resides. For example, in FIG. 1, for the simplex processor $S1_1$, the FIFO identification number can be expressed as (2, 4), the processing element involved being connected to network element 2 at port number 4 thereof.

In the particular example of FIG. 1, in which only a single overall cluster is shown, the FIFO identifications can be uniquely defined by such numbers. If multiple clusters are used in a larger, overall system, each FIFO can be further identified by a triple number with the first number for entry being the number of a particular cluster. In the following discussion it is assumed that only one cluster in an overall exemplary data processing ensemble is used. Accordingly, each FIFO identification can be designated by an ordered pair of numbers as discussed above.

Outputs from a processing element ar provided via its associated output FIFO buffer onto a broadcast bus 14 and are, thus, broadcast to the other network elements via line-drivers 15. The three line drivers are designated as L for providing outputs to the network element to the left of the broadcasting network element, by 0 for providing outputs to the network element opposite the broadcasting network element, and by R for providing outputs to the network element to the right of the broadcasting network element. Inputs are supplied from other network elements to a particular network element via line-receivers 16 (the same left, opposite and right designations being used) to a voting bank of FIFO elements 17, wherein the designation M is for the output received from the particular network element depicted (i.e, "my" input). A vote made by voter circuit 18 of the input data supplied therein, is then supplied to each of the processor elements of the fault containment region via a vote bus 19 to each of the input FIFO elements 13 associated with the processor elements 11. In some data processing exchanges, as discussed in more detail below, the data may not be voted on in a particular operating cycle, but is instead rebroadcast for voting in a subsequent cycle. In such a case, input data is supplied to a "reflect" or "rebroadcast" bank of FIFO elements 20 where they are temporarily stored for re-broadcast via line-drivers 15, so that subsequent data, which has been so re-broadcast and processed, is then received on line-receivers 16 for voting from the vote bank FIFO element 17.

An appropriate fault-tolerant clock is provided for synchronizing the operation of the network elements and the processing elements associated therewith as would be well known to those in the art. Alternatively, synchronization of the processing elements may be performed according to the functional synchronization technique described in our copending application filed concurrently herewith, entitled "Synchronization of Fault-Tolerant Parallel Processing Systems" which application is incorporated by reference herein. Suitable control processor circuitry 22 is provided for shifting the appropriate data out from or in to the processing elements as desired during the overall processing cycle, or cycles, as would also be well known to those in the art.

Reconfiguration of the overall ensemble is effected under suitable program control by the control processors of the network elements so as to change the mapping of FIFO identifications to group identifications. For example, if the member $T4_3$, corresponding to FIFO identification (2, 3) were to fail in the system shown in FIG. 1, a possible reconfiguration option is to change the identification of $S1_1$ to $T4_3$ in order to restore the redundancy of the T4 group. An alternative configuration would be to disband the T4 group and to convert processor elements $T4_1$ and $T4_2$ to simplex elements $S4_1$ and $S3_1$.

An overall data structure, which can be referred to as a Configuration Table (CT) which is resident in the memory structure of each of the processing elements and in the memory structure of the control processors of the network elements, contains such mapping information. Reconfigurations, such as described above can be effected by appropriate changes in any Configuration Table. An example of a Configuration Table for the particular cluster ensemble shown in FIG. 1 is depicted below.

| FIFO ID | VIRTUAL ID | Member |
| --- | --- | --- |
| (1,1) | T1 | 1 |
| (1,2) | T2 | 2 |
| (1,3) | T3 | 3 |
| (1,4) | T5 | 1 |
| (2,1) | T2 | 1 |
| (2,2) | T3 | 2 |
| (2,3) | T4 | 3 |
| (2,4) | S1 | 1 |
| (3,1) | T1 | 3 |
| (3,2) | T3 | 1 |
| (3,3) | T4 | 2 |
| (3,4) | T5 | 3 |
| (4,1) | T1 | 2 |
| (4,2) | T2 | 3 |
| (4,3) | T4 | 1 |
| (4,4) | T5 | 2 |

As can be seen in FIGS. 1 and 2, a processing element can send information, i.e., messages, into the aggregate of network elements and receive messages therefrom through its associated FIFO's. Each processing element possesses a memory-mapped interface to its own dedicated pair of FIFO elements. In addition to the memory-mapped output FIFO and the input FIFO, a processing element possesses a smaller outgoing control FIFO into which the processing element can write control information, such as the class of information exchange (discussed in more detail below) and the source member of the exchange. A small array of control status registers 23 (CSR) provides information to the processing element concerning the status of the processing element, such as whether its output FIFO s full, its input FIFO has a message available, as well as other information. The message format can consist, for example, of information identifying the source group identification and the destination group identification, as well as the contents of the message to be sent.

In many message-transfers, or information exchanges, the network element aggregate executes only a single round voting protocol, which consists of broadcasting of the message from a source network element to all the other network elements including itself and a receiving of such broadcast messages by all the network elements including itself followed by a vote via the vote bank FIFO's 17 and voter circuitry 18 therein.

In other cases, the network element aggregate executes a two-round voting protocol, a first round consisting of a broadcasting of the message from a source network element to all the other network elements, including itself, and a second round consisting of another broadcast of the message by all the network elements to each other including itself, subsequently followed by receipt and voting thereof. The reflect bank FIFO's 20 are used as the destination of the messages transmitted during the first round of such protocol and act then as the source of the messages which are broadcast in a second round. Such messages are then routed into the vote bank FIFO's durinq the second broadcast round for voting in voter circuitry 18 at the end of the communal broadcast.

In order to send a message, a processing element executes the following sequence of actions. The processing element first examines its control status register 21 to determine whether the output FIFO 13 can accept the message. If the output FIFO is full the processing element must wait until there is sufficient room to hold the outgoing message. If the output FIFO is not full, the processing element writes the message into such output FIFO. After writing the message, the processing element writes the exchange class (discussed in more detail below) and the source member number to the control FIFO, which notifies the network element that message transmission has been requested by the processing element, corresponding o the FIFO identification of the control FIFO. Once the processing element delivers the message to the output FIFO for delivery by the network element, the processing element can then carry on whatever other actions it may have for processing.

In order to receive a message, the processing element performs the following sequence of actions. The processing element first determines that the message can be read from its input FIFO by reading the control status register which indicates that an available message is waiting in the input FIFO. If the control status register indicates that a message is available in the input FIFO, the processing element reads the message from the input FIFO.

Such operation permits any ordering or interleaving of the sending and receiving of messages, or parts of messages. Thus, a processing element may send part of a message, then attempt to read another message, and then continue sending the original message.

Figure 3:
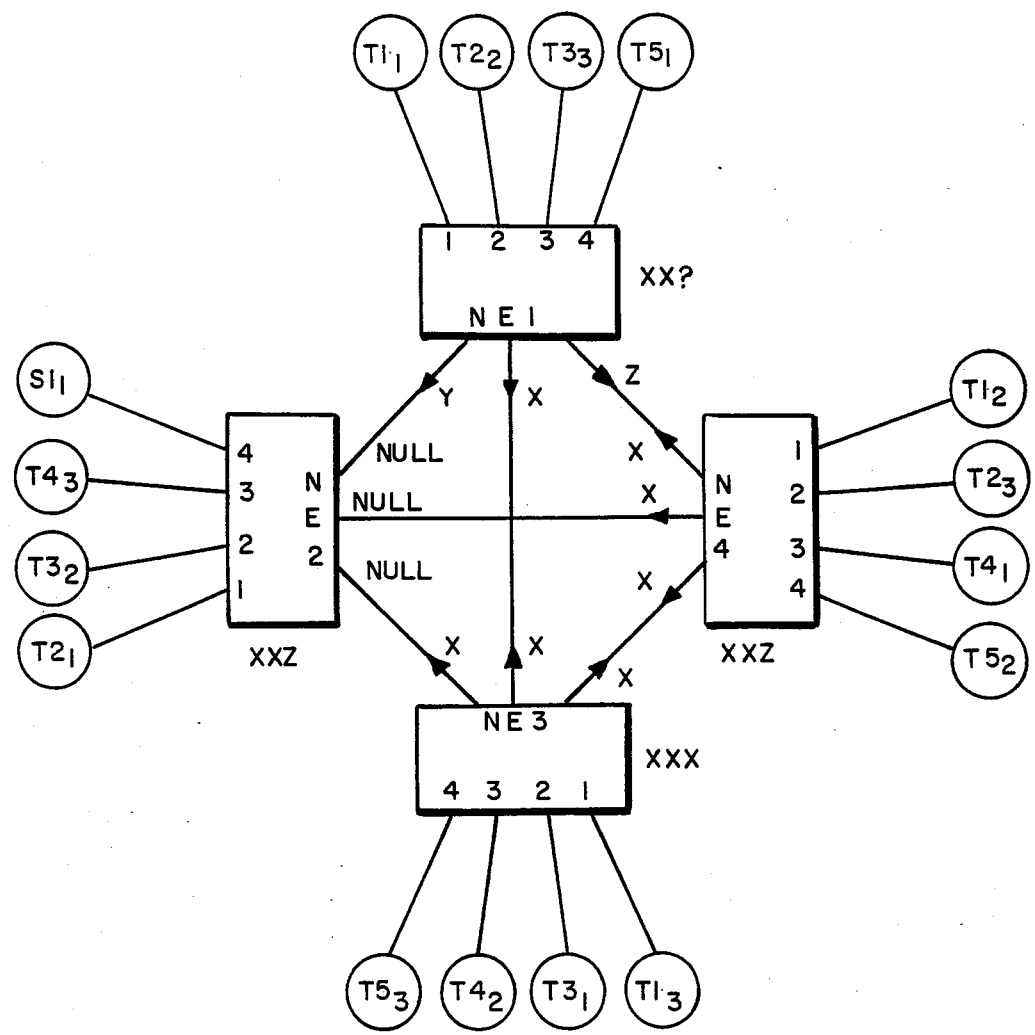
FIG. 3 demonstrates a class 1 message exchange in the system of FIG. 1.

Two classes of intra-cluster message exchanges can be defined, based on the level of redundancy of the message source. A first class of message exchanges (identified as a Class 1 or C1exchange) is one which emanates from a fault masking group having at least (2f+1) members (thus, for a single-fault masking group there are at least three members which act as the source for such message. In a C1 exchange, the redundant messages are transmitted to their destinations through disjoint communication paths, followed by a vote of the received copies thereof by each recipient network element. In the face of up to f message sources or transmission path faults, f+1) correct messages will always get through the system and a correct voted copy will be obtained at each recipient network element. FIG. 3 shows a C1 exchange emanating from a triad redundant processing site T1 (comprising $T1_1$, $T1_2$ and $T1_3$). Thus, each of the network elements, NE1, NE2 and NE3 transmits the message from its associated T1 processing element, while no message (i.e., a "null") is transmitted from network element NE2.

In the example of FIG. 3, if network element 1 supplies three different messages, only one of which (x) is correct, while the other two (y) and (z) are faulty, the overall system assures that correct messages will get through to the processing elements of each of the fault containment regions. Thus, network element NE2 will receive two correct messages (x), from NE3 and NE4, while it receives an incorrect message (y) from NE1. However, by voting there will be a majority of correct messages at NE2. Likewise, at NE3, correct messages will be received from NE1 and NE4 (a null will be received from NE2), so that a vote will also provide a correct message (x). Network element NE4 will receive two correct messages (x) (one from NE3 and one from itself) and an incorrect message (z) from NE1. Therefore it will also in its voting process provide a correct message (x). NE1 will receive correct messages from NE3 and NE4 and independently of which message it receives from itself, it will still vote a correct message (x).

Figure 5:
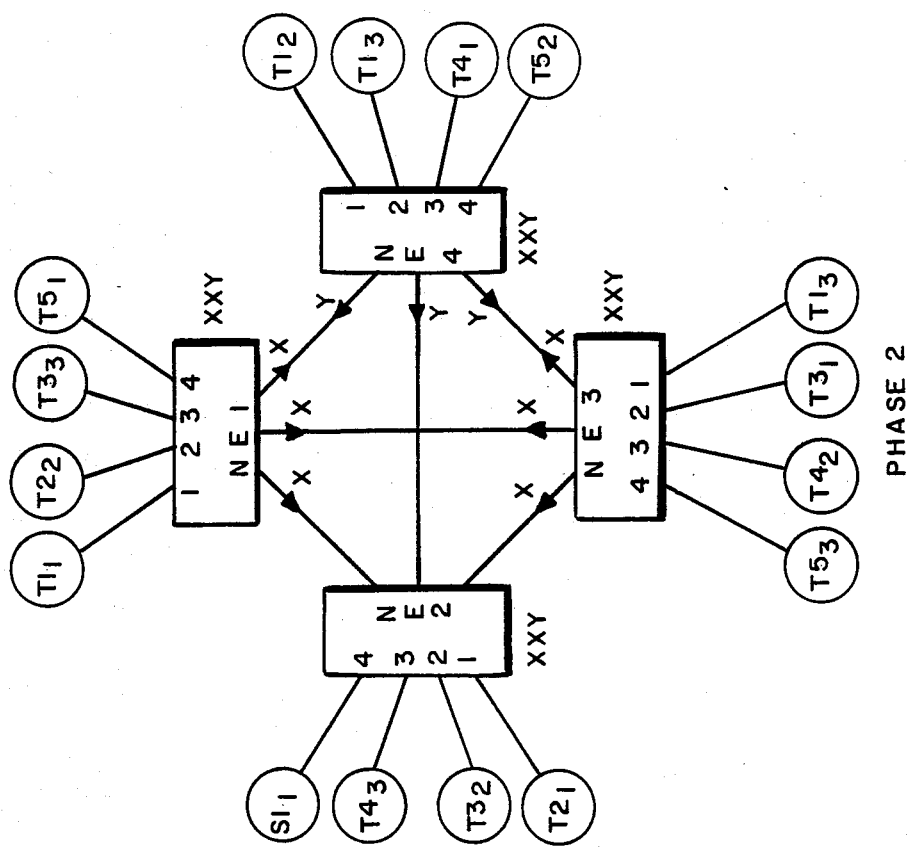
FIGS. 4 and 5 demonstrate a class 2 message exchange in the system of FIG. 1.
Figure 4:
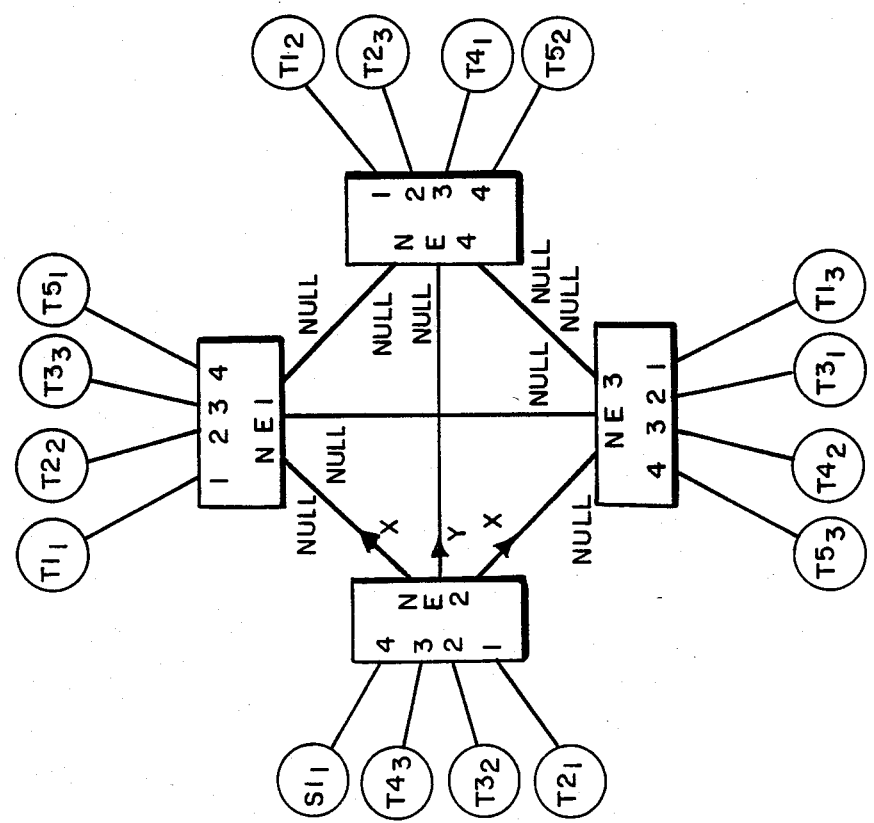

In a Class 2 (C2) exchange, the message source is not sufficiently redundant to permit voting to guarantee that all recipients receive a correct, or identical, copy of the message. In the example shown in FIGS. 4 and 5, a message is transmitted by a simplex processor element, e.g., $S1_1$ associated with network element NE2. In the first $C_2$ exchange round of communication, as shown in FIG. 4, let it be assumed that one of the messages (y) supplied from $S1_1$ to its opposite network element NE4 is faulty, while the other messages (x) supplied to its left and right network elements (NE1 and NE3) are correct, the destination of the message being the triad processor elements T5 as shown. No messages are transmitted from network elements NE1, NE3, NE4. Thus, correct messages are received at NE1 and at NE3, but an incorrect message is received at NE4 during the first communication round. During the second communication round, however, each of the network elements broadcasts to each of the other network elements as shown in FIG. 5. Thus, NE1 receives two correct messages (x) from NE2 and NE3, while it receives an incorrect message from NE4. However, there is a sufficient number of correct messages to provide a vote which results in the supplying of the correct message (x) to $T5_1$. At $T5_2$ correct messages are received from NE1 and NE3, although an incorrect message is received from itself. Again, a sufficient number of correct messages are provided to produce the correct voted output for $T5_2$. At NE3 correct messages are received from NE1 and itself, although an incorrect message is received from NE4. Again, a sufficient number of correct messages is provided to produce the correct voted output for $T5_3$.

Thus, in accordance with the overall cluster configuration of the invention, correct messages will be received in cases for Class 1 exchanges, wherein the exchange arises from at least (2f +1) members of the processing site, and bitwise identical messages will be received for Class 2 exchanges wherein the message source is insufficiently redundant to allow voting to guarantee that all recipients receive correct messages during a single communication cycle. However, in the latter case, such messages can be guaranteed to provide identical inputs in a two cycle exchange operation.

The message transmissions, message receptions, and voting operations discussed above are controlled using a suitable control processor 22 in each network element which processors can be programmed by using suitably devised software for controlling the execution and timing of the various operations and components as described above. The devising of suitable software for use in the control processors of the network elements for such purpose would be well within the skill of those in the art based on the above described information and need not be described in further detail here:

While the above described embodiment shows a particular configuration of a typical cluster in accordance with one embodiment of the invention, modifications thereto will occur to those in the art within the spirit and scope of the invention. For example, the physical size of a cluster may be varied from the particular embodiment shown in FIG. 1. As another example, FIG. 6 shows a cluster comprising six network elements 25 with eight processing elements 26 per network element. In another emobidment of the invention, a relatively large ensemble can be formed from a plurality of clusters which are interconnected through redundant communication links. For example, FIG. 7 shows an ensemble 30 comprising four clusters 31 each having six network elements 32 with eight processing elements 33 per network element. The number of clusters and their intercluster arrangement topology can also be varied within the spirit and scope of this invention.

Hence, the invention is not to be limited to the particular embodiments described above, except as defined by the appended claims.

What is claimed is:

1. A fault tolerant processing system for providing processing operations, while tolerating f failures in the execution thereof, said system comprising a plurality of at least (3f+1) fault containment regions, each of said regions including
a plurality of processors;
network means connected to said processors and to the network means of the others of said plurality of fault containment regions;
groups of one or more processors being configured to form a plurality of redundant processing sites at least one of said groups having (2f+1) processors, each of the processors of a group being included in a different one of said fault containment regions;
each network means of a fault containment regions including
means for providing communication operations between said network means and the network means of the others of said fault containment regions, each of said network means being connected to each other network means by at least (2f+1) disjoint communication paths, a minimum of (f+1) rounds of communication being provided among the network means of said fault containment regions in the execution of a said processing operation; and
means for synchronizing the communication operations of said network means with the communications operations of the network means of said other fault containment regions.

2. A fault-tolerant processing system in accordance with claim 1 and further including means for re-configuring said groups of one or more processors so as to form different pluralities of redundant processing sites.

3. A fault tolerant processing system in accordance with claim 1 wherein said communication providing means includes
means for transmitting messages from a processor of a fault containment region to the network means of said other fault containment regions;
means for receiving messages from the network means of said other fault containment regions; and
voting means responsive to said received messages for providing a voted message to a processor of said fault containment region.

4. A fault tolerant processing system in accordance with claim 3 wherein said transmitting means includes
an output buffer means connected to each of said processors for storing one or more messages from its connected processor;
control means for transmitting a message from said output buffer means to said other network means.

5. A fault tolerant processing system in accordance with claim 4 wherein said receiving means includes
an input buffer means connected to each of said processors for storing one or more voted messages;
said control means responsive to messages received from said other network means for providing a voted message to the input buffer of said processors.

6. A fault tolerant processing system in accordance with claim 5 wherein said output buffer means and said input buffer means are first-in, first-out buffer means.

7. A fault tolerant processing system in accordance with claim 3 wherein said network means include
temporary storage means for temporarily storing received messages when voting of said received messages is not required;
said control means storing said received messages in said temporary storage means when voting thereof is not required and re-transmitting said temporary stored messages to the network means of said other fault containment regions;
said receiving means receiving said re-transmitted messages from said other network means; and
said voting means being responsive to said received, re-transmitted messages for providing a voted message to the processors of said fault containment region.

8. A fault tolerant processing system in accordance with claim 7 wherein said temporary storage means are first-in, first-out buffer means.

9. A fault tolerant processing system in accordance with claim 3 wherein said voting means includes
receiver buffer means for storing one or more received messages; and
a voter circuit responsive to the stored messages received from the network means of said other fault containment regions for providing a voted message to the processors of said fault containment region.

* * * * *